(12) United States Patent
Rosen et al.

(10) Patent No.: US 8,976,857 B2
(45) Date of Patent: Mar. 10, 2015

(54) QUALITY-BASED VIDEO COMPRESSION

(75) Inventors: Andrew D. Rosen, Redmond, WA (US); John Conrad, Auburn, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 767 days.

(21) Appl. No.: 13/243,241

(22) Filed: Sep. 23, 2011

(65) Prior Publication Data

US 2013/0077675 A1  Mar. 28, 2013

(51) Int. Cl.
*H04N 7/12* (2006.01)
*H04N 19/124* (2014.01)
*H04N 19/15* (2014.01)
*H04N 19/177* (2014.01)
*G06K 9/36* (2006.01)

(52) U.S. Cl.
CPC ..... *H04N 19/0009* (2013.01); *H04N 19/00187* (2013.01); *H04N 19/00284* (2013.01)
USPC ......................................... 375/240; 382/235

(58) Field of Classification Search
USPC ....................................................... 375/240
See application file for complete search history.

(56) References Cited

U.S. PATENT DOCUMENTS

| 6,081,264 | A | | 6/2000 | Rosen et al. |
| 6,100,940 | A | * | 8/2000 | Dieterich ....................... 348/700 |
| 6,212,233 | B1 | * | 4/2001 | Alexandre et al. ........ 375/240.03 |
| 6,229,925 | B1 | * | 5/2001 | Alexandre et al. ............ 382/239 |
| 6,233,278 | B1 | * | 5/2001 | Dieterich ................. 375/240.03 |
| 6,678,324 | B1 | * | 1/2004 | Yamauchi ................ 375/240.04 |
| 6,879,632 | B1 | * | 4/2005 | Yokoyama ............... 375/240.13 |
| 6,937,770 | B1 | * | 8/2005 | Oguz et al. ..................... 382/235 |
| 7,240,001 | B2 | * | 7/2007 | Chen et al. ..................... 704/230 |
| 7,349,474 | B2 | | 3/2008 | Bagni et al. |
| 7,525,463 | B2 | * | 4/2009 | Saunders et al. .............. 341/143 |
| 7,539,612 | B2 | * | 5/2009 | Thumpudi et al. ......... 704/200.1 |
| 7,590,746 | B2 | * | 9/2009 | Slater et al. ................... 709/229 |
| 7,778,813 | B2 | * | 8/2010 | Zhou ............................... 703/15 |
| 7,881,387 | B2 | * | 2/2011 | Han et al. ................. 375/240.25 |

(Continued)

FOREIGN PATENT DOCUMENTS

| WO | 2008079508 A1 | 7/2008 |
| WO | 2010069367 A1 | 6/2010 |

OTHER PUBLICATIONS

Xie, et al., "Sequence-Based Rate Control for Constant Quality Video", Retrieved at <<http://ieeexplore.ieee.org/stamp/stamp.jsp?tp=&arnumber=1037963>>, IEEE International Conference on Image Processing, vol. 1, Sep. 22-25, 2002, pp. 1-77-1-80.

*Primary Examiner* — Sath V Perungavoor
*Assistant Examiner* — Howard D Brown, Jr.
(74) *Attorney, Agent, or Firm* — Bryan Webster; Kate Drakos; Micky Minhas

(57) ABSTRACT

Various embodiments are disclosed herein that relate to quality-based video encoding. For example, one disclosed embodiment provides a video compression system configured to compress a video item at a constant average quality to form compressed video data. Further, the system is configured to compare a bit rate of each portion of a plurality of portions of the compressed video data to a threshold bit rate, and if a bit rate of a selected portion of the compressed video data meets or exceeds the threshold bit rate, then adjust a compression process variable while compressing a segment of the video item corresponding to the selected portion of the compressed video data to reduce the bit rate of the portion of the compressed video data.

20 Claims, 4 Drawing Sheets

(56) References Cited

U.S. PATENT DOCUMENTS

| | | | |
|---|---|---|---|
| 8,554,569 B2 * | 10/2013 | Chen et al. ................... 704/500 |
| 2006/0224762 A1 | 10/2006 | Tian et al. |
| 2008/0205518 A1 * | 8/2008 | Wilinski et al. .......... 375/240.08 |
| 2009/0067493 A1 | 3/2009 | Jun et al. |
| 2012/0314764 A1 * | 12/2012 | Tidemann et al. ....... 375/240.03 |

* cited by examiner

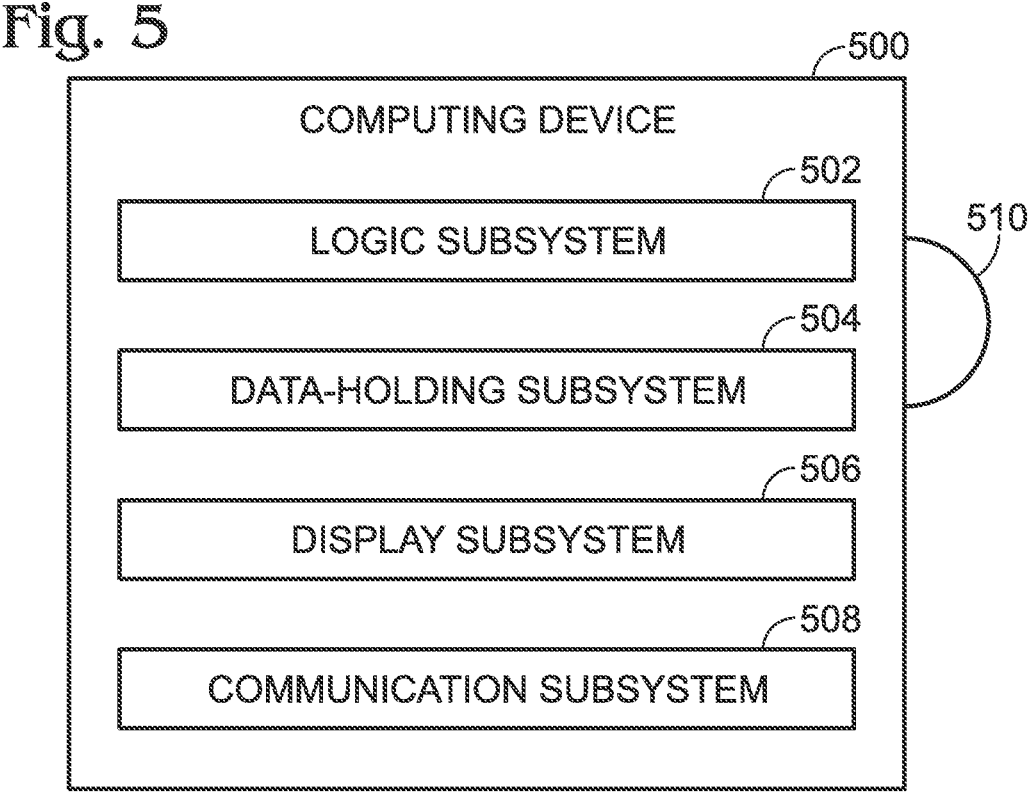

QUALITY-BASED VIDEO COMPRESSION

BACKGROUND

Compressing a large and diverse catalog of long-form entertainment content, such as video content, for public consumption may pose challenges. One approach to compressing such content involves selecting a desired average or maximum bit rate for the content in the catalog, and then compressing each item in the catalog according to the selected bit rate. However, the compression of each content item may be affected by the visual complexity of the content item. For example, a more visually complex item may be more difficult to compress to a desired bit rate without unduly impacting playback quality. As a result, a content provider may choose to compress a catalog at a relatively high bit rate to ensure that a desired minimum playback quality is achieved across the catalog. This may utilize a potentially significant amount of data storage.

SUMMARY

Various embodiments are disclosed herein that relate to quality-based video encoding. For example, one disclosed embodiment provides a video compression system configured to compress a video item at a constant average quality to form compressed video data. Further, the system is configured to compare a bit rate of each portion of a plurality of portions of the compressed video data to a threshold bit rate, and if a bit rate of a selected portion of the compressed video data meets or exceeds the threshold bit rate, then adjust a compression process variable while compressing a segment of the video item corresponding to the selected portion of the compressed video data to reduce the bit rate of the portion of the compressed video data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a block diagram of an embodiment of a computing device.

DETAILED DESCRIPTION

Figure 1:
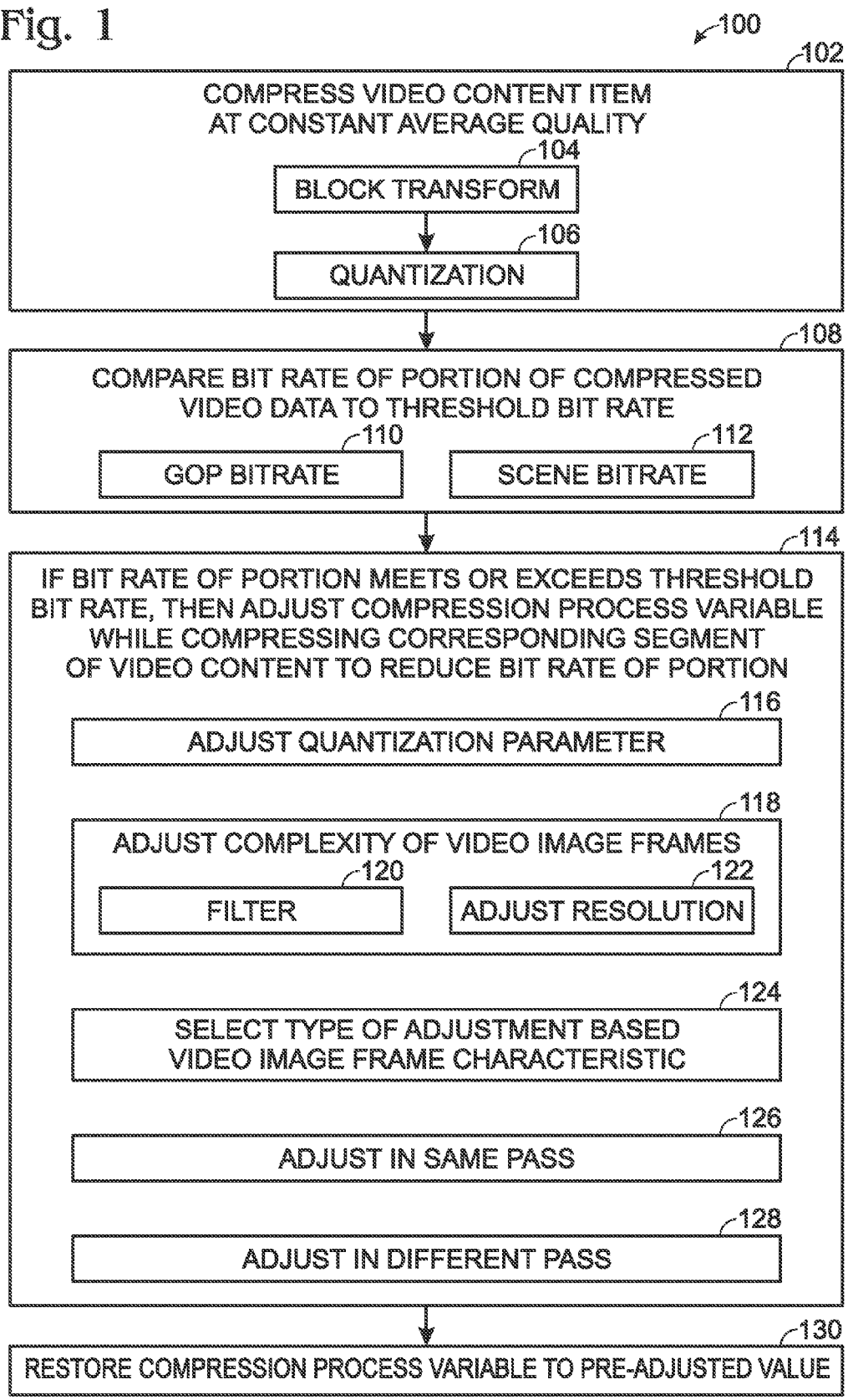
FIG. 1 shows a flow diagram depicting an embodiment of a method of compressing video data.

As mentioned above, efficiently encoding a large and diverse collection of entertainment content may pose challenges. For example, variable bit rate (VBR) mechanisms are often used to optimize image quality across a duration of an individual show. However, such mechanisms may not lead to the encoding of a catalog of consistent quality when applied one content item at a time, as such mechanisms may not be configured to make allowances for the situation where some content items are intrinsically more complex and/or have a greater percentage of more complex scenes than other content items. This may impact an overall playback quality consistency of a catalog.

One potential method to overcome such problems may be to encode a catalog of video items at a constant bit rate selected to ensure that all video items can be played at an acceptable quality. However, as mentioned above, this may result in encoding less complex video items at an excessive bit rate.

Another approach may be to encode all shows in a catalog at a fixed quantization parameter ("QP") instead of a specific bit rate. This may allow compression of each video item to produce a file that is adaptively sized to reflect its complexity. However, such fixed QP encoding may fail to take advantage of perceptual masking opportunities that exist inside each image frame of a video item, as techniques such as differential quantization and activity masking would be precluded by the use of fixed QP methods. Further, a simple fixed QP method may introduce unconstrained and essentially undefined peak bit rate excursions. This may increase the difficulty of the testing and provisioning of client-side bandwidth headroom.

Yet another potential approach to addressing such issues may be to manually judge the complexity of each video item and assign a bit rate accordingly. For example, a video content provider may adjust a bit rate of each of its video streaming services based upon historical data about the nature of each upcoming show. However, this approach may be time-consuming and imprecise.

A related approach may involve combining fixed QP encoding with manual variable bit rate control. For example, each individual video item may be encoded using a constant QP, and then re-encoded using a variable bit rate control model. In between these two encode steps, a manual calculation may be performed to determine an intrinsic complexity of the video item from the results of the first encoding. From the determined intrinsic complexity, an optimal target bit rate for the variable bit rate control re-encoding may be selected. The resulting playback quality consistency for a catalog of video items encoded in this manner may be more precise than the use of historical information to adjust a bit rate. However, this method likewise may be resource-intensive.

Accordingly, embodiments are disclosed herein that allow the efficient coding of a collection of video items at a selected quality level while allowing for the use of differential quantization and perceptive masking techniques, and also while controlling short-term peak bit rate excursions. As described above, encoding a collection of video items at a selected quality level, rather than at a selected bit rate, allows the file size of each video item to adapt to the intrinsic complexity of that video item. This may allow lower complexity video content items to be encoded at a lower bit rate than if the items were encoded based upon a catalog-wide bit rate target. Further, allowing a QP to incrementally increase or decrease around the selected quality level may allow for more efficient compression relative to fixed QP compression.

To avoid excessive short-term bit rates that may occur due to compressing based upon quality instead of based upon bit rate, the disclosed embodiments monitor for bit rate excursions above a selected peak bit rate, and selectively apply one or more bit rate reduction techniques when peak bit rate excursions are detected. This may help to maintain all catalog items below a desired maximum bandwidth for proper streaming performance while maintaining consistent quality, even though individual catalog items may potentially vary in bit rate.

FIG. 1 shows a flow diagram of an embodiment of a method 100 of compressing a video content item at a desired quality level while controlling peak bit rate excursions. While presented in the context of compressing a single video content item, it will be understood that method 100 may be used to compress a catalog of content items to achieve a consistent viewing experience across the catalog.

Method 100 comprises, at 102, compressing a video content item at a constant average quality to produce compressed video data based upon a selected target QP. As shown respectively at 104 and 106, the compression process may utilize a block transform process and a quantization process. Examples of such compression methods include, but are not limited to, MPEG and H.264 compression methods. The term "constant average quality" as utilized herein signifies compression in which differential quantization, perceptive masking, and/or other such techniques may vary the selected target QP value applied on a scene-by-scene basis and/or GOP-by-GOP (group of pictures) basis, and/or on individual blocks of pixels within an image frame, but where the overall video item on average is encoded at the selected target QP value. As a more specific example, at the scene-by-scene level or GOP-by-GOP level, perceptual masking based upon factors such as overall motion may be used to increment or decrement the selected target QP value. Likewise, at the block-by-block level within an image frame, regions of higher texture and lower texture may be encoded via differential quantization, wherein the assigned differential quantization levels may be selected to be reflective of the perceptual masking value of visually busy high contrast patters compared to the sensitivity of the human visual system. Further, the selected target QP value also may be decremented to control detected peak bit rate excursions, as explained in more detail below.

Method 100 next comprises, at 108, comparing the bit rate of a portion of the compressed video data to a threshold bit rate. If the bit rate of the portion of the compressed video data exceeds the threshold bit rate, then method 100 comprises, at 114, adjusting a compression process variable while compressing a corresponding segment of the video item to reduce the bit rate of that portion of the compressed video data. In this manner, the video content item may adaptively compress to a suitable file size for the desired quality level without any short-term bit rate spikes that may affect playback performance.

Any suitable portion of the compressed video may be compared to the threshold bit rate when monitoring for peak bit rate excursions. For example, as shown at 108 and 110, the portion may correspond to a GOP and/or a scene from the video content item. It will be understood that, in some instances, a GOP in some cases may correspond to an entire scene, while in other instances, a GOP may correspond to only a portion of a scene, depending for example upon the complexity of the video content item and the compression processed used. For example, the use of an integer block transform may allow for larger GOPs, potentially as large as an entire scene, than the use of a floating point number block transform.

Likewise, any suitable compression parameter may be adjusted to control the bit rate of the portion of compressed video. For example, in some embodiments, a quantization parameter used for quantization may be adjusted, as indicated at 116. In other embodiments, a complexity of one or more video image frames may be adjusted prior to compressing the frames, as indicated at 118. Any suitable method may be used to adjust the complexity of one or more video image frames. For example, the complexity may be reduced by applying one or more filters to the image frames, as shown at 120, and/or dynamically reducing or otherwise adjusting a resolution of the images, as indicated at 122, prior to performing a block transform process. Examples of suitable filters include, but are not limited to, brick wall filters, Gaussian blur filters, and film grain removal filters.

Monitoring for bit rate excursions on a scene-by-scene or GOP-by-GOP basis further may allow a GOP-level and/or scene-level calculation of perceptual masking components to be performed, ignoring time components beyond the current GOP and/or scene. This may allow use of bandwidth control mechanisms, including but not limited to those mentioned above, that operate at the broader level of entire GOPs and/or whole scenes to be used in appropriate degrees and at appropriate locations to help reduce the need for frame-level rate control tools. This may allow for more of each show to be compressed at QP values suggested by perceptual masking algorithms. It will be understood that the above-described examples of portions of compressed video are illustrative and are not intended to be limiting in any manner.

As a more specific example, in some embodiments, dynamic resolution adjustment may be applied on a scene-by-scene basis. One implementation of dynamic resolution control is found in Microsoft SMOOTH STREAMING PIFF media files, developed by the Microsoft Corporation of Redmond, Wash. PIFF files, when streamed, may have no material download time considerations. However, PIFF files are configured to deliver a highest resolution consistent with perceived signal to noise considerations, and may employ dynamic resolution control on a scene-by-scene basis to achieve this goal. Where variable GOP sizes are chosen appropriately to correspond to scenes in a video content item, the occasional gated exceptions to the constant average quality rule would likewise occur on a scene-by-scene basis. This may enable the use of dynamic resolution control on a same or similar time frame and to a same or similar degree as other perceptual masking tools and/or bit rate control tools.

In some embodiments, different types of bit rate reduction may be used depending upon the characteristics of a video image frame, scene and/or GOP, as indicated at 124. For example, some embodiments may prioritize and/or sequence different bit rate control tools based upon the characteristics of one or more frames of the video content item. Any suitable characteristic of a video content item may be used to prioritize and/or sequence different bit rate controls, including but not limited to image texture. As a more specific example, when a peak bit rate excursion is detected, the response to the detected excursion may be determined by a degree of visually masking textures present in the scene and/or GOP. If the scene/GOP is a low texture shot, the resolution of the scene may be dynamically reduced while maintaining the QP at the target level. On the other hand, if the scene/GOP is a high texture shot, then the QP may initially be increased. If the increase in the QP does not reduce the bit rate sufficiently, then the resolution may be decreased to achieve a desired bit rate reduction. It will be understood that this example is not intended to be limiting, and that any other suitable sequencing and/or prioritization of bit rate reduction methods may be used.

In some embodiments, the compression and bit rate control gating may be performed in a single compression pass, as shown at 126. Thus, in such embodiments, bit rate reduction techniques may be applied to a scene or GOP after a peak bit rate excursion in the scene or GOP is detected. As such, the adjustment of the compression parameter is applied only to the portion of the scene or GOP that remains to be compressed after the bit rate excursion is detected. In other embodiments, as shown at 128, the adjustment of the compression parameter is applied in a different pass through the compressor. In such embodiments, the first pass may be used to locate portions of the video content item in which the short-term bit rate would exceed the maximum bit rate. Then, in the second pass, bit rate control methods may be used to reduce the bit rate of those portions of the video content, both prior to and after the actual point at which the bit rate excursion would be detected in a single pass method.

Continuing with FIG. 1, method 100 next comprises, after completing the compression of the portion of the video content item with the peak bit rate excursion, restoring the adjusted compression process variable to a pre-adjusted value, as shown at 130. In this manner, compression at the selected constant average quality continues until another peak bit rate excursion is detected.

Figure 2:
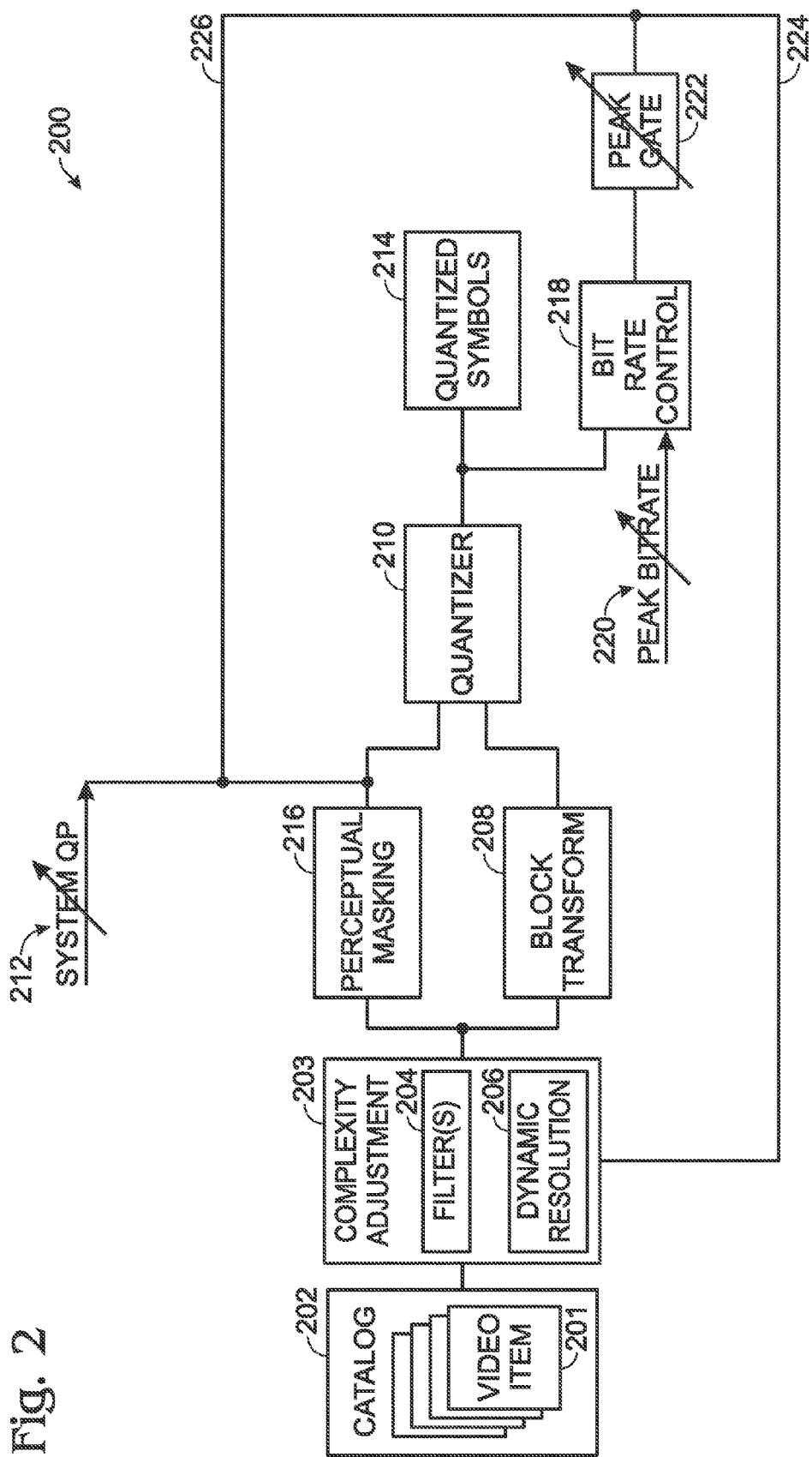
FIG. 2 shows an embodiment of a video data compressor configured to compress video items at a constant average quality while limiting peak bit rate excursions.

FIG. 2 shows a block diagram of a logical architecture of an example embodiment of a single pass video compressor 200 configured to compress video content at a constant average quality while controlling peak bit rate excursions. It will be understood that the depicted architecture may be implemented as a computer program comprising instructions executable by a computing device to perform the disclosed processes. As described in more detail below, detected peak bit rate excursions are used to provide feedback to bit rate control mechanisms of compressor 200 during a compression process. It will be understood that a multiple pass compressor may have a similar architecture, except that bit rate monitoring from one compressor pass may be utilized to control bit rate reduction mechanisms in a second compressor pass.

Compressor 200 is illustrated as compressing a video content item 201 taken from a catalog 202 of video content items. In the depicted embodiment, image frames from the video content item 201 pass first through a complexity-adjustment module 203, such as a dynamic resolution control module 204 and/or a filter module 206 controllable to selectively reduce image complexity for controlling peak bandwidth excursions, among other tasks. Block transform module 208 may use any suitable block transform process, including but not limited to integer transform and discrete cosine transform processes. The output from the block transform module 208 is provided to a quantizer 210 for quantization. As illustrated at 212, a selected system QP value is also provided as an input to the quantizer 210. The quantizer 210 outputs quantized symbols 214.

The output from the dynamic resolution control module complexity-adjustment module 203 is also provided to a perceptual masking module 216 configured to calculate perceptual masking components. From these calculations, the perceptual masking module 216 may change the actual QP value provided to quantizer 210 from the system QP value 212.

The output from the quantizer 210 is provided to a bit rate control 218 that compares the bit rate of a portion of a video content item to a selected peak bit rate 220. The bit rate control 218 is configured to allow the bit rate of compressed video content items to vary, potentially widely, while compressing at the selected constant average quality level, but to trigger a gating mechanism 222 when the peak bit rate 220 is exceeded. The peak bit rate 220 may have any suitable value, and may be varied based upon such factors as client or communications channel bandwidth limitations.

The gating mechanism 222, when triggered by the bit rate control 218, is configured to control one or more compression parameters to reduce the bit rate of the portion of the video content item. For example, as indicated at 224, the gating mechanism 222 may provide feedback to the complexity-adjustment reduction module 203 for dynamic resolution reduction, application of one or more filters, and/or any other suitable complexity-reduction process. Likewise, as indicated at 226, the gating mechanism 222 may provide feedback to the quantizer 210 to adjust a QP level provided to the quantizer. As mentioned above, the bit rate control 218 may be configured to track the bit rate of a portion of a video content item, such as a GOP and/or scene. Thus, the bit rate control provided by the bit rate control mechanism 218 and the gating mechanism 222 may be applied on a GOP-by-GOP basis, scene-by-scene basis, or on any other suitable portion of a compressed video content item. It will be understood that the various bit rate control schemes applied may be selectable by a user.

A more specific example embodiment of a single pass compression is as follows. In this example, the frame QP is set to 4, but all human visual system tools are allowed, including differential quantization. When an individual GOP exceeds a selected system peak bit rate excursion limit, rate-control actions are applied to a point.

In this example embodiment, a peak excursion limit for a 1280 pixel-wide file is chosen to be 12 mbps. When this value is exceeded, the QP value is allowed to increase up to a frame QP of 7. If the resulting GOP size still exceeds 12 mbps, then a low-pass pre-filter is applied to the source image. The resulting produced file may have some individual scenes that are noticeably blurred. However, most scenes in the show may be delivered with a same or similar quality as most scenes from other video content items in the catalog, assuming all video content items are compressed in a similar manner. It is noted that the total produced file size for any item may be disregarded. As a result, this example embodiment may deliver consistent quality for shows that have frequent high-complexity shots and for shows that have few high-complexity shots, as the more complex shows are allowed to have a higher bit rate and total file size than the less complex shows. In this manner, title-to-title picture quality variation may be avoided compared to catalogs in which shows of different complexity are recorded at different QP values.

A more specific example of a double pass embodiment is as follows. In this example, a catalog of shows is encoded at a selected constant average quality level, and with peak bit rate excursions driving degrees of dynamic resolution control along with QP adjustment. As mentioned above, dynamic resolution control is employed by Microsoft Corporation's SMOOTH STREAMING SDK (software development kit), available from the Microsoft Corporation, to avoid noticeable blocky portions and other distortions in images. Combining bitrate control as disclosed herein with dynamic resolution control may help to segregate problematic scenes that may reveal what may otherwise be innocuous compression artifacts. Thus, this embodiment may help to control compromises between sharpness and smoothness in streaming video in a manner that is immune from vagaries of underlying rate control sub-systems found in various video encoders.

A first pass is used for determining a rate control and down-resolution plot for a top-level 10 mbps .ISMV file of a SMOOTH STREAMING folder set. In this pass, a pair of source files is submitted to a process that resembles the first part of a two-pass VBR encoding process. Each of these first-pass processes utilizes a so-called "chain link analysis" employing a checkerboard pattern of high and low fixed QP values. The produced bitrates for each frame of this first pass are stored in a manner that that separately totals the coarse blocks' and fine blocks' bits per frame values. One chain link analysis is performed at a resolution of 1920 wide, while the other is performed at 640 wide. The 1920 first pass also captures a shot-by-shot texture value. The four bits-per-frame values that are accumulated during the pair of first pass operations allow an estimate of the likely bit rate that will result from the application of selected QP and/or down-resolution values during the second encoding pass.

As the second pass is encoded utilizing constant average quality as described above, it is assumed that any selected picture may be encoded with differential quantization in the second pass. The coefficients produced by differential quantization thus may cause the average quality of all of the blocks in any picture to be lower than the QP value assigned to the frame overall. However, the first pass is performed without differential quantization. Therefore, an assumption may be made that the frame QP ultimately assigned during the second pass may be some value higher than the constant average quality setting calculated in the first pass. Likewise, an assumption may be made that, on a frame by frame basis, during the second pass, a degree of differential quantization is taken into account and used to determine an appropriate increment in each coded frame's overall QP assignment.

In this example, a peak bit rate control strategy utilized for any particular peak excursion may be determined based upon various factors, such as a degree of visually masking textures present in the scene. If a particular scene is a low texture scene, the resolution may be reduced to reduce bit rate while maintaining the selected constant average quality. On the other hand, if the scene is a high texture scene, QP may initially be allowed to rise (e.g. from 4 to 7), and if the encoded scene still exceeds the peak bit rate value, then the resolution is decreased until the bit rate is below the peak value.

As a more specific example, if the first pass on the 1920 width image indicates that the peak-limited average bit rate at a constant average of QP=4 is less than the equivalent of 10 mbps, then the QP is not adjusted throughout the second pass, allowing the file size to adapt to the complexity of the video content item. On the other hand, if the peak-limited average bit rate is over 10 mbps, then the higher texture scenes may be allowed to rise to a maximum constant average QP of 7. It will be understood that, due to differential quantization, some individual blocks during higher texture scenes may still have a net QP of 4 or less.

If the predicted equivalent average VBR from the first pass is still too high after raising the QP, then the resolution of low-texture scenes may be lowered (e.g. scenes with texture values falling in the lowest 5%) to an amount that leads to a prediction of the desired average of 10 mpbs overall. An expected degree of bit rate reduction may be determined from the reduction in area, or via linear interpolation from the chain-link analysis at the 640 width. As a result, such very low texture shots may be significantly reduced in resolution, but the rest of the scenes stay at the 1920 width resolution. If reduction of the resolution of the low-texture scenes does not achieve the desired 10 mbps budget even after dropping to a selected minimum resolution (e.g. 432 wide), then the resolution of images at a next-lowest texture range (e.g. 5-10% lowest texture values) may be lowered.

To create a 6.9 mbps .ISMV file of the SMOOTH STREAMING folder set, a similar approach may be used, except that in the first estimation no QP rise is estimated for shots with the lowest 20% of texture values. A larger percentage of the total running time is represented by the shots that fall in this lowest 20% texture range. As a result, a larger collection of scenes is subject to reduction of resolution for the 6.9 mbps file than the 10 mbps file.

A similar approach also may be used to create a 4.6 mbps file, except that a maximum resolution of 1280 may be employed, and resolution reduction may be allowed for the lowest 40% of texture values. Likewise, at 3.2 mbps VBR and below, in addition to the resolution cap, a more aggressive approach may be employed in which resolution reduction is expected for most scenes, and thus applied to a lowest 60% of texture values, for example. In such an implementation, only high texture scenes, or very low complexity scenes, remain likely to be encoded at the resolution cap. Thus, different peak excursion controls may be applied depending upon a maximum desired bitrate for a compressed file.

Figure 3:
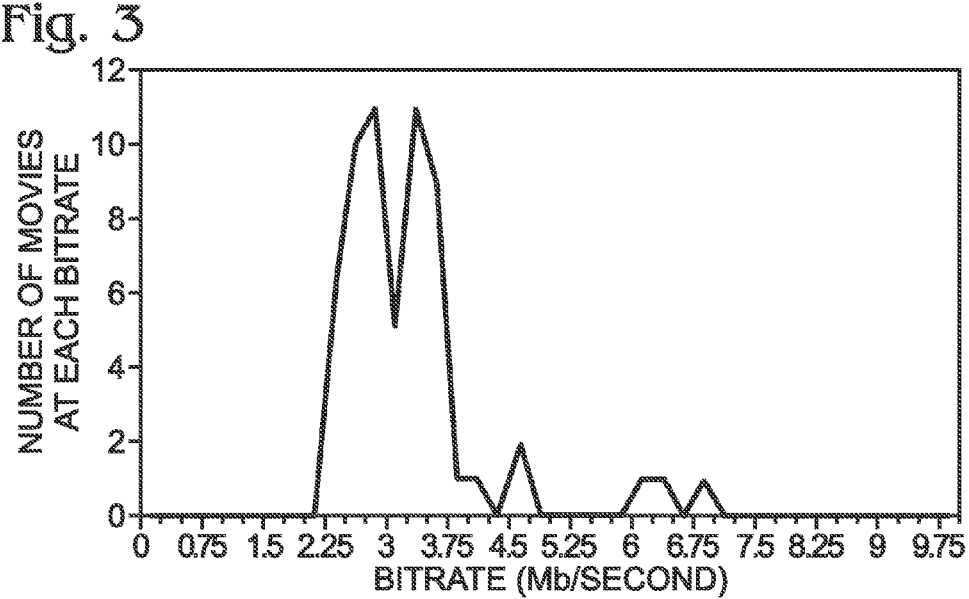
FIG. 3 illustrates a distribution of bit rates of a selection of video items encoded at a first constant average quality according to an embodiment of the present disclosure.
Figure 4:
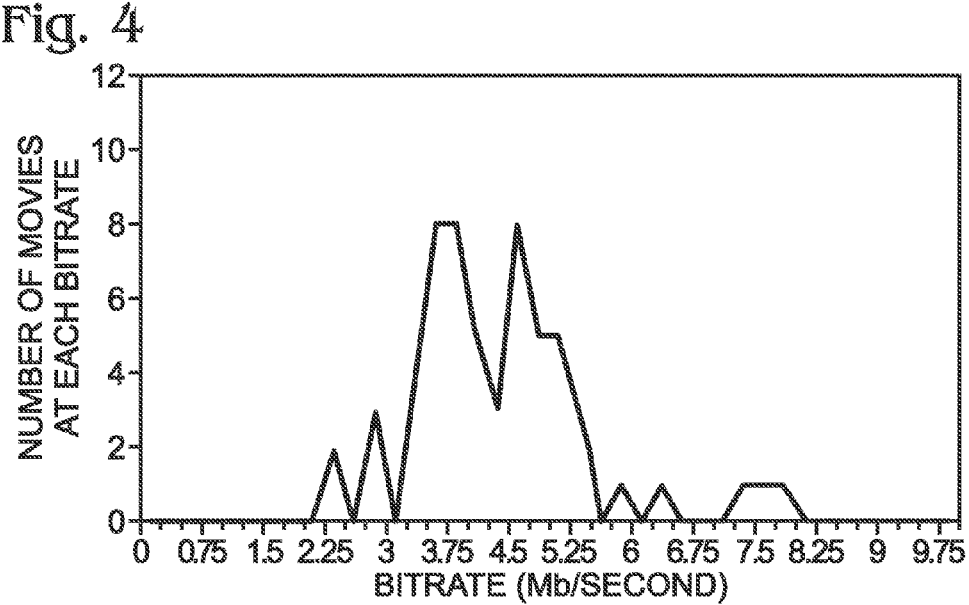
FIG. 4 illustrates a distribution of bit rates of the selection of video items of FIG. 4 encoded at a second, higher constant average quality according to an embodiment of the present disclosure.

FIGS. 3 and 4 illustrate distributions of individual average bitrates for sixty shows when each show is encoded corresponding to a specified constant picture quality. FIG. 3 illustrates the distribution at a lower, coarser quality level of QP=5, and FIG. 4 at a higher, less coarse quality level of QP=4. The data shown in FIGS. 3 and 4 were generated by encoding the first half-hour of sixty movies at each of these two quality levels. From these figures, it can be seen that the bit rate at which any individual item is encoded may vary widely from item to item, as opposed to items encoded by constant bit rate encoding schemes. Further, it can be seen that the bit rate distribution widens at the higher quality level. Depending upon the constant average quality selected, the disclosed embodiments in some cases may allow a catalog to be encoded at a lower average bit rate than if encoded by a constant bit rate strategy, as a constant bit rate selected for a constant bit rate strategy may be quite high to ensure that complex video content items are encoded at an acceptable playback quality.

In some embodiments, the above described methods and processes may be tied to a computing system including one or more computers. In particular, the methods and processes described herein may be implemented as a computer application, computer service, computer API, computer library, and/or other computer program product.

FIG. 5 schematically shows a nonlimiting computing system 500 that may perform one or more of the above described methods and processes. Computing system 500 is shown in simplified form. It is to be understood that virtually any computer architecture may be used without departing from the scope of this disclosure.

Computing system 500 includes a logic subsystem 502 and a data-holding subsystem 504. Computing system 500 may optionally include a display subsystem 506, communication subsystem 508, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 502 may include one or more processors that are configured to execute software instructions. Additionally or alternatively, logic subsystem 502 may include one or more hardware or firmware logic machines configured to execute hardware or firmware instructions. Processors of logic subsystem 502 may be single core or multicore, and the programs executed thereon may be configured for parallel or distributed processing. Logic subsystem 502 may optionally include individual components that are distributed throughout two or more devices, which may be remotely located and/or configured for coordinated processing. One or more aspects of logic subsystem 502 may be virtualized and executed by remotely accessible networked computing devices configured in a cloud computing configuration.

Data-holding subsystem 504 may include one or more physical, non-transitory, devices configured to hold data and/or instructions executable by logic subsystem 502 to implement the herein described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem in the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

It is to be appreciated that data-holding subsystem 504 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and the like may be used to describe an aspect of computing system 500 that is implemented to perform one or more particular functions. In some cases, such a module and/or program may be instantiated via logic subsystem 502 executing instructions held by data-holding subsystem 504. It is to be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" are meant to encompass individual or groups of executable files, data files, libraries, drivers, scripts, database records, etc.

When included, display subsystem 506 may be used to present a visual representation of data held by data-holding subsystem 504. As the herein described methods and processes change the data held by the data-holding subsystem, and thus transform the state of the data-holding subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or data-holding subsystem 504 in a shared enclosure, or such display devices may be peripheral display devices.

When included, communication subsystem 508 may be configured to communicatively couple computing system 500 with one or more other computing devices. Communication subsystem 508 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A video compression system, comprising:
a logic subsystem configured to execute instructions; and
a data-holding subsystem comprising instructions stored thereon that are executable by the logic subsystem to:
compress a video item in a first compression pass at a constant average quality to form compressed video data;
compare a bit rate of each portion of a plurality of portions of the compressed video data to a threshold bit rate; and
if a bit rate of a selected portion of the compressed video data meets or exceeds the threshold bit rate, then in a second compression pass adjust a compression process variable while compressing a segment of the video item corresponding to the selected portion of the compressed video data to reduce the bit rate of the portion of the compressed video data.

2. The system of claim 1, wherein each portion of the compressed video data comprises a group of pictures.

3. The system of claim 1, wherein each portion of the compressed video data comprises a scene in the video item.

4. The system of claim 1, wherein the instructions are executable to compress the video item and to compare the bit rate of each portion of the compressed video data to the threshold bit rate in the first compression pass.

5. The system of claim 1, wherein the instructions are executable to compress the video item, to compare the bit rate of each portion of the compressed video data to the threshold bit rate, and to adjust the compression process variable in a same compression pass.

6. The system of claim 1, wherein the instructions are executable to adjust the compression process variable by adjusting a quantization parameter used in a quantization process.

7. The system of claim 1, wherein the instructions are executable to utilize differential quantization while compressing the video item at the constant average quality.

8. The system of claim 1, wherein the instructions are executable to apply a bit rate reduction method based upon a texture value of one or more images of the video content item.

9. The system of claim 1, wherein the instructions are executable to adjust the compression process variable to reduce a complexity of one or more frames of the video item prior to performing a block transform process on the one or more image frames.

10. The system of claim 9, wherein the instructions are executable to reduce the complexity of the one or more frames of the video item by one or more of dynamically reducing a resolution of the one or more frames and applying a filter to the one or more frames.

11. A method of compressing a plurality of video items, the method comprising:
for each video item, compressing the video item at a constant average quality utilizing a block transform process and a quantization process comprising differential quantization performed at a selected target quantization parameter value to form compressed video data;
while compressing the video item, comparing a bit rate of each portion of a plurality of portions of the compressed video data to a threshold bit rate; and
if the bit rate of a selected portion of the compressed video data meets or exceeds a threshold bit rate, then adjusting a compression process variable while compressing the video item to reduce the bit rate of the selected portion of the compressed video data.

12. The method of claim 11, wherein each portion of the compressed video data comprises a group of pictures.

13. The method of claim 11, wherein adjusting a compression process variable comprises adjusting the selected target quantization parameter value while compressing the selected portion of the compressed video data.

14. The method of claim 11, wherein adjusting a compression process variable comprises one or more of adjusting a resolution of one or more frames of the video item and applying a filter prior to performing the block transform process on the one or more frames.

15. The method of claim 11, wherein the selected target quantization parameter value is common to the plurality of video items.

16. The method of claim 11, wherein compressing the video item and comparing the bit rate of each portion of the compressed video data to the threshold bit rate are performed in a first compression pass, and wherein adjusting the compression process variable while compressing the video item to reduce the bit rate of the compressed video data is performed during a second compression pass.

17. The method of claim 11, wherein compressing the video item, comparing the bit rate of each portion of the compressed video data to the threshold bit rate, and adjusting the compression process variable while compressing the video item to reduce the bit rate of the compressed video data are performed in a same pass.

18. A video compression system, comprising:
a logic subsystem configured to execute instructions; and
a data-holding subsystem comprising instructions stored thereon that are executable by the logic subsystem to:
compress a video item at a constant average quality to form compressed video data;
compare a bit rate of each portion of a plurality of portions of the compressed video data to a threshold bit rate; and
if a bit rate of a selected portion of the compressed video data meets or exceeds the threshold bit rate, then adjust a compression process variable while compressing a segment of the video item corresponding to the selected portion of the compressed video data to reduce the bit rate of the portion of the compressed video data by reducing a complexity of one or more frames of the video item prior to performing a block transform process on the one or more image frames.

19. The system of claim 18, wherein the instructions are executable to reduce the complexity of the one or more frames of the video item by one or more of dynamically reducing a resolution of the one or more frames and applying a filter to the one or more frames.

20. The method of claim 18, wherein the instructions are further executable to restore the compression process variable to a pre-adjusted value after compressing the portion of the video item.

* * * * *